United States Patent
Neubauer et al.

(10) Patent No.: US 9,010,454 B2
(45) Date of Patent: Apr. 21, 2015

(54) HANDHELD WORK APPARATUS WITH SWITCHABLE POWER

(75) Inventors: Andreas Neubauer, Ludwigsburg (DE); Tim Gegg, Remseck (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 605 days.

(21) Appl. No.: 13/312,713

(22) Filed: Dec. 6, 2011

(65) Prior Publication Data

US 2012/0138322 A1  Jun. 7, 2012

(30) Foreign Application Priority Data

Dec. 6, 2010  (DE) .................. 10 2010 053 583

(51) Int. Cl.

| | | |
|---|---|---|
| B25F 5/00 | (2006.01) | |
| B27B 17/02 | (2006.01) | |
| B24B 27/06 | (2006.01) | |
| A01D 34/90 | (2006.01) | |
| B23D 59/00 | (2006.01) | |
| B26D 5/00 | (2006.01) | |
| B26D 1/25 | (2006.01) | |

(52) U.S. Cl.
CPC ............ B24B 27/0691 (2013.01); A01D 34/90 (2013.01); B23D 59/001 (2013.01); B25F 5/00 (2013.01); B26D 1/25 (2013.01); B26D 5/00 (2013.01)

(58) Field of Classification Search
USPC ............. 173/2, 4, 176, 181, 217, 47; 81/469; 83/477.2; 318/362, 375, 757; 340/426.1, 572.1, 573.1
See application file for complete search history.

(56) References Cited

U.S. PATENT DOCUMENTS

| | | | | |
|---|---|---|---|---|
| 5,014,794 A | * | 5/1991 | Hansson | 173/181 |
| 5,170,358 A | * | 12/1992 | Delio | 700/177 |
| 5,688,160 A | * | 11/1997 | Pozzetti et al. | 451/5 |
| 5,984,020 A | * | 11/1999 | Meyer et al. | 173/2 |
| H1821 H | * | 12/1999 | Kosinski | 173/180 |
| 6,234,051 B1 | * | 5/2001 | Bareggi | 81/479 |
| 6,236,177 B1 | * | 5/2001 | Zick et al. | 318/362 |
| 6,536,536 B1 | * | 3/2003 | Gass et al. | 173/2 |
| 6,687,567 B2 | * | 2/2004 | Watanabe | 700/168 |
| 6,848,516 B2 | * | 2/2005 | Giardino | 173/2 |
| 6,923,268 B2 | * | 8/2005 | Totsu | 173/2 |
| 6,978,846 B2 | * | 12/2005 | Kawai et al. | 173/2 |
| 7,055,620 B2 | * | 6/2006 | Nadig et al. | 173/2 |
| 7,121,358 B2 | * | 10/2006 | Gass et al. | 173/2 |

(Continued)

FOREIGN PATENT DOCUMENTS

CN        1460011 A        12/2003

*Primary Examiner* — Scott A. Smith
(74) *Attorney, Agent, or Firm* — Walter Ottesen P.A.

(57) ABSTRACT

The invention relates to a portable, handheld work apparatus such as a trimmer, a cut-off machine, a chain saw or the like, having a motor (5, 33) to drive a rotating, exchangeable work tool (13). A control unit (15) serves to control the operation of the motor (5, 33). The control unit (15) determines the rotational speed (n) and/or the power (P) of the motor (5, 33). According to the invention, the motor (5, 33) can be operated in a first operating mode (I) with reduced rotational speed ($n_0$) and/or power ($P_0$) and in at least a second operating mode (II) with an increased rotational speed ($n_1$) and/or power ($P_1$). In dependence on a release signal, the control uses exclusively the first operating mode (I) for a limited operation and the second operating mode (II) for an expanded operation.

16 Claims, 3 Drawing Sheets

(56) References Cited

U.S. PATENT DOCUMENTS

| | | |
|---|---|---|
| 7,159,775 B2 | 1/2007 | Aoki et al. |
| 7,204,320 B2 * | 4/2007 | Berg ................................ 173/2 |
| 7,207,080 B2 * | 4/2007 | Hilscher et al. ................ 15/22.1 |
| 7,216,723 B2 * | 5/2007 | Ohtsu et al. ....................... 173/2 |
| 7,538,503 B2 | 5/2009 | Machens et al. |
| 7,628,219 B2 * | 12/2009 | Frauhammer et al. .......... 173/18 |
| 7,652,438 B2 | 1/2010 | Rosskamp |
| 7,726,412 B2 * | 6/2010 | Matsunaga ....................... 173/2 |
| 7,735,465 B2 * | 6/2010 | Kunert et al. ................. 123/257 |
| 7,770,658 B2 * | 8/2010 | Ito et al. ........................... 173/1 |
| 2006/0010850 A1 | 1/2006 | Jacobson et al. |

* cited by examiner

HANDHELD WORK APPARATUS WITH SWITCHABLE POWER

CROSS REFERENCE TO RELATED APPLICATION

This application claims priority of German patent application no. 10 2010 053 583.4, filed Dec. 6, 2010, the entire content of which is incorporated herein by reference.

FIELD OF THE INVENTION

The invention relates to a handheld work apparatus, in particular a portable handheld work apparatus such as a chain saw, a cut-off machine, a trimmer or the like.

BACKGROUND OF THE INVENTION

Handheld portable work apparatus such as, for example, a cut-off machine have a rotating cutting disc which is driven by a combustion engine in a rotational speed range of 8,000 to 12,000 revolutions per minute. The cutting disc is provided with a protective cover to provide sufficient protection in the case of cutting disc breakage. The use of a high quality cutting disc which must be precisely balanced is a precondition for a trouble free, safe operation of a cut-off machine. A safe working over a long period of time is ensured with a high quality cutting disc.

If low quality cutting discs are used on work apparatus having a high powered motor, the cutting disc often breaks after only a short period of operation.

SUMMARY OF THE INVENTION

It is an object of the invention to increase the operating safety of handheld work apparatus having rotating, exchangeable work tools.

According to the invention, it is provided that the operating range of the driving motor is partitioned into a first operating mode with a reduced rotational speed and/or reduced power and at least one second operating mode with an increased rotational speed and/or increased power. The control unit which controls the motor is so configured that it, in dependence on a release signal for controlling the operation, operates the motor in a limited operating range exclusively in the first operating mode and in an expanded operating range in the second operating mode. Thus, the motor power can be reduced in dependence on a release signal.

The control unit is connected with a detecting unit whose output signal forms the release signal. The detection unit is connected with a reading unit which detects and evaluates the identifier of the work tool mounted on the work apparatus. The release signal is generated in dependence on the evaluation in order to operate the motor in the one or in the other operating mode. Thus, it can be recognized in a simple manner whether a work tool attuned to high power is mounted so that the work apparatus can be operated in optimal operation with full power in the second operating mode.

In a further embodiment of the invention, it is provided that when detecting an identifier with the read unit, the identifier is compared to a identifier stored in a memory module, in particular a memory module of the detecting unit. If the read identifier corresponds to the stored identifier of an acceptable work tool all operating modes of the motor specific operating range are enabled. If the read identifier differs from the stored, acceptable identifiers, only the first operating mode is enabled and the work apparatus is operated only with reduced power.

In a particular embodiment of the invention, the read unit is an RFID transmit and receive unit, whereby the work tool has an RFID tag with the corresponding identifier. The read unit is arranged on the work apparatus in a rotatably fixed manner, while the RFID tag is arranged inside the clamping area of a rotating work tool. Because of the rotation of the work tool it is ensured that the RFID tag reaches the detection area of the read unit and the identifier can thus be read out.

In an expedient embodiment, the control unit exclusively has two operating modes. The control unit switches between the two operating modes in dependence on the value of the release signal (for example "0" or "1") as a result of the comparison. If the release signal is entirely absent, the control unit switches into a safe mode. This safe mode can, for example, be formed by an operating mode having reduced rotational speed and/or reduced power.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
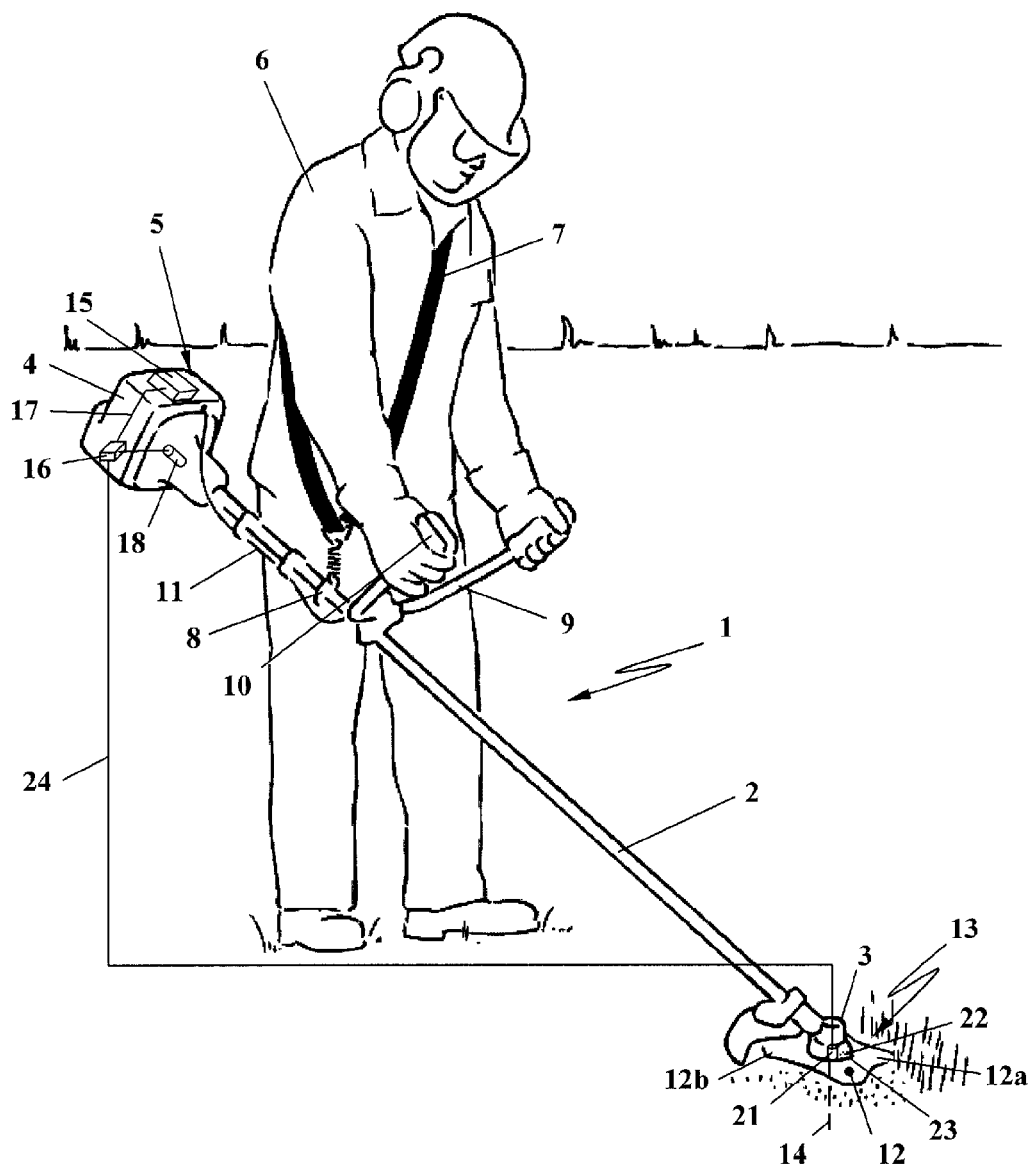
FIG. 1 is a schematic view of a handheld work apparatus as a trimmer as an example.
Figure 3:
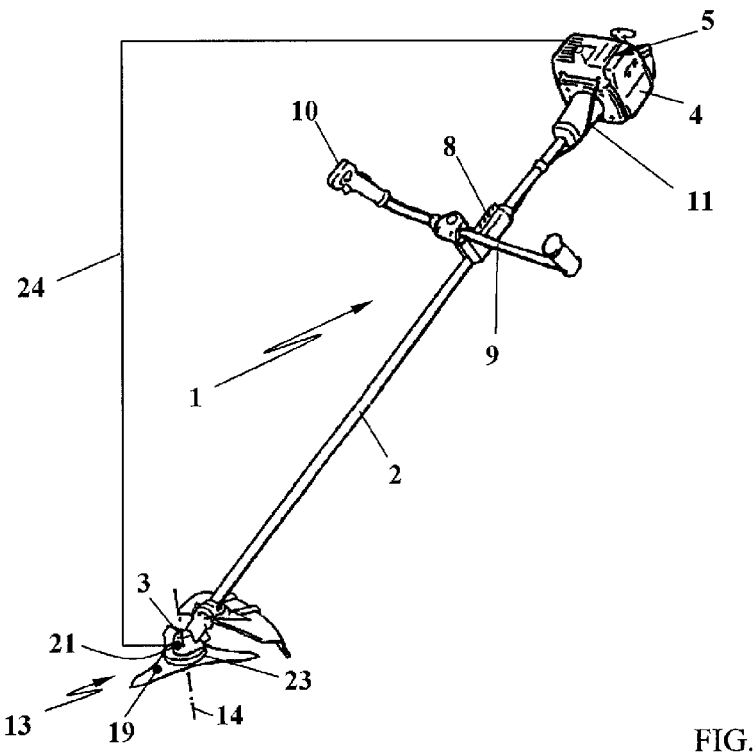
FIG. 3 shows a handheld work apparatus in the form of a trimmer having a changed work tool.
Figure 4:
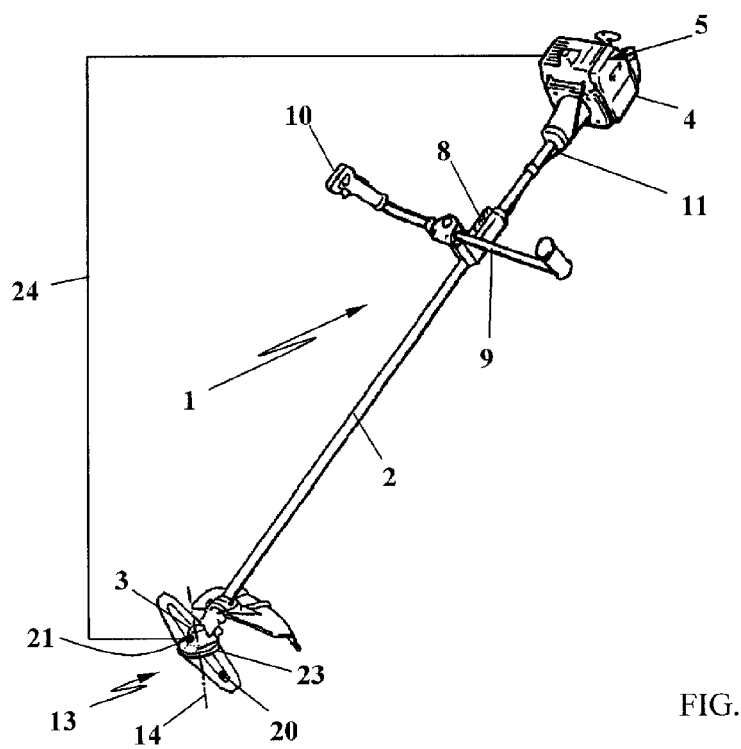
FIG. 4 shows a handheld work apparatus of FIG. 3 with a third work tool.

The handheld work apparatus shown in FIGS. 1, 3 and 4 is configured as a trimmer; the work apparatus is an example of an arbitrary, portable, handheld work apparatus and could also be a chain saw, a cut-off machine or similar work apparatus having a rotating work tool. An electric motor or a combustion engine is provided as a drive motor in such a work apparatus.

The shown trimmer 1 essentially comprises an elongated guide tube 2, which at one end has a gearhead 3 and at the other end has a housing 4 with an electric motor or combustion engine 5 arranged therein. The trimmer 1 is carried by a user 6 via a belt 7 which is hooked onto a retaining device 8 on the guide tube 2. Further, a handle arrangement in the form of a guide rod 9, via which the user guides the trimmer 1 in a scythe like manner, is fixed on the guide tube 2.

One of the handles 10 of the guide rod 9 is configured as an operating handle 10 and has control elements for operating the motor 5, for example a throttle trigger for operating an electric motor or a combustion engine 5 provided in the housing 4. The operating handle 10 is advantageously connected to the adjustment units on the motor, for example, a combustion engine 5, via a bowden cable 11.

A work tool 13 is fixed at the gearhead 3. The work tool is rotatably driven about an axis 14. For this, the gearhead 3 is connected to the output of the motor 5 in the housing 4 via a drive shaft guided in the guide tube 2.

The blade 12, which is rotatably fixed on the gearhead as a work tool 13 in FIG. 1, in top plan view is an approximately square cutting blade which has four cutting sections. Two respective cutting sections (12a, 12b) in this case lie diametrically opposite each other in relation to the axis 14.

Figure 2:
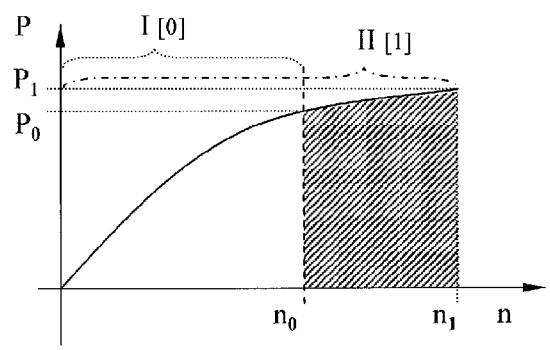
FIG. 2 is a schematic view of an operating curve of power as a function of the rotational speed.

A control unit 15 is provided in the housing 4. The control unit 15 is configured as an electronic control unit and serves to control the motor 5, wherein an adapting of the control unit 15 to the type of drive motor 5 (electric motor, combustion engine) is provided. In dependence on the operating conditions, the control unit 15, for example, controls the ignition of the combustion engine 5 in dependence on the crankshaft angle position. The control unit 15 can further be used to control the composition of the air/fuel mixture in that, for example, the fuel supply is set corresponding to the operating point of the combustion engine 5 via an electromagnetic valve. The control unit 15, thus, sets an ignition time and mixture in line with an engine-specific operating field as is schematically shown in FIG. 2. The control of an electric motor can take place in the same manner, for example by changing the rotational speed (speed controller) or adapting the current consumed (power).

The operating field in FIG. 2 is shown as a simple power curve P(n) over the rotational speed n. As shown in FIG. 2, a first, lower operating mode I with reduced rotational speed $n_0$ and/or reduced power $P_0$ is provided in the operating field as well as a second operating mode II which includes the entire power and rotational speed range. A division into a lower operating mode I and an upper operating mode II can be advantageous. The second operating mode II has an increased rotational speed $n_1$ and an increased power $P_1$.

This operating field is available to the control unit 15 as a setting range. Thereby it is advantageous when exclusively two operating modes are provided, whereby the technical complexity of switching between the operating modes can be kept simple.

The control unit 15 is connected to a detection unit 16 which transmits its output signal to the control unit 15 via a signal line 17. The control unit 15 interprets the output signal of the detection unit 16 as a "release signal" in such a manner that, in the case of a "release signal—0", only the first operating mode I is authorized, and thus the control unit 15 only has a limited operating field available. In this limited operating field, namely the lower operating mode I, a reduced rotational speed $n_0$ and/or a reduced power $P_0$ is given.

If the potential of the output signal changes this is evaluated as a "release signal—1", whereupon the control unit 15 releases the second operating mode II of FIG. 2, so that an increased rotational speed $n_1$ and/or an increased power $P_1$ are/is possible.

If the release signal is completely absent, thus no signal "0" nor a signal "1" is present, the control unit switches into a safe mode. This safe mode can, for example, be formed by an operating mode with reduced rotational speed and/or reduced power.

The detection unit 16 can, for example, set the output signal (release signal) to "0" in dependence on vibrations which occur and when a predetermined vibration threshold value is exceeded, in order to, for example, keep the vibrations for the operator to a minimum. For this, the detection unit 16 can be connected to a vibration sensor 18 which is mounted at a suitable location of the work apparatus. Increased vibrations can, for example, occur when the cutting blade 12 is defective, whereby the operator receives a notification about the necessity to change the cutting blade 12. On the other hand, it can thus also be ensured that the cutting blade 12 rotating with high rotational speeds of 8,000 to 12,000 revolutions per minute is a high quality precisely balanced work tool. Only when such a precise, high quality work tool is mounted on the gearhead 3 and the vibrations are low does the arrangement permit an operation over the entire operating field of the motor 5.

In FIG. 3, a three-winged cutting blade 19 is shown and, in FIG. 4, a two-winged cutting blade 20 is shown. Even with these cutting blades according to FIGS. 3 and 4, a high quality, precisely balanced component must be used so that the full operating field of the motor 5 can be used. If increased vibrations occur, for example as a result of low quality cutting blades, the operating field (FIG. 2) is limited for the protection of the operator 6 and an operation of the combustion engine 5 is only possible in the first, lower operating mode I with reduced rotational speed $n_0$ and reduced power $P_0$.

For the detection of the cutting blade being used, it is practical to provide a read unit 21 on the work apparatus in order to, for example, detect an identifier of the work tool 13 mounted on the work apparatus. In the shown embodiment, the read unit 21 is provided in the area of the gearhead 3 of the trimmer 1 and is, in particular, configured as an RFID send and receive unit. The read unit 21 is connected with the detection unit 16 and transmits the data of the mounted work tool 13 to the detection unit 16. For this, the work tool expediently has an RFID-tag 22 which is read by the read unit 21 which is held in a non-rotatable manner on the work apparatus. For this, it is practical that the RFID-tag 22 is itself fixed on the work tool 13 in the clamping area 23 of the work tool 13. If the RFID-tag 22 enters the detecting area of the read unit, energy is supplied to the RFID-tag 22 via its antenna so that it is capable to wirelessly transmit its data to the read unit 21. This data is transmitted to detection unit 16 wirelessly or—as shown in the example embodiment—via the signal line 17 to be evaluated there. If a high quality, precisely balanced work tool 13 is applied and carries the corresponding identifier, this is recognized by the read unit 21 and the identifier is communicated to the detection unit 16. The detection unit 16 checks the read identifier with data stored in a data memory which is provided in the detection unit 16 and contains the identifiers of the permitted work tools 13 for the work apparatus. If the read identifier of the mounted blade 12 is a permitted identifier, then the motor 15 is operated over the entire operating curve; the operator has the full power of the work apparatus available.

If the identifier of the applied cutting blade 12 is not included in the registered identifiers of the detection unit 16, the operating curve is limited to the first, lower operating mode I. The rotational speed and the power are reduced.

The arrangement can also be used to control the motor in its operating curve corresponding to the cutting blade (12, 19, 20) used. The identifier of the used cutting blade (12, 19, 20) (FIGS. 3 and 4) is read out via the read unit 21. The identifier is compared to the data stored in the detection unit 16 and an operating curve (FIG. 2) of the combustion engine 5 is controlled corresponding to the predetermined characteristic values stored in the memory of the detection unit 16.

Figure 5:
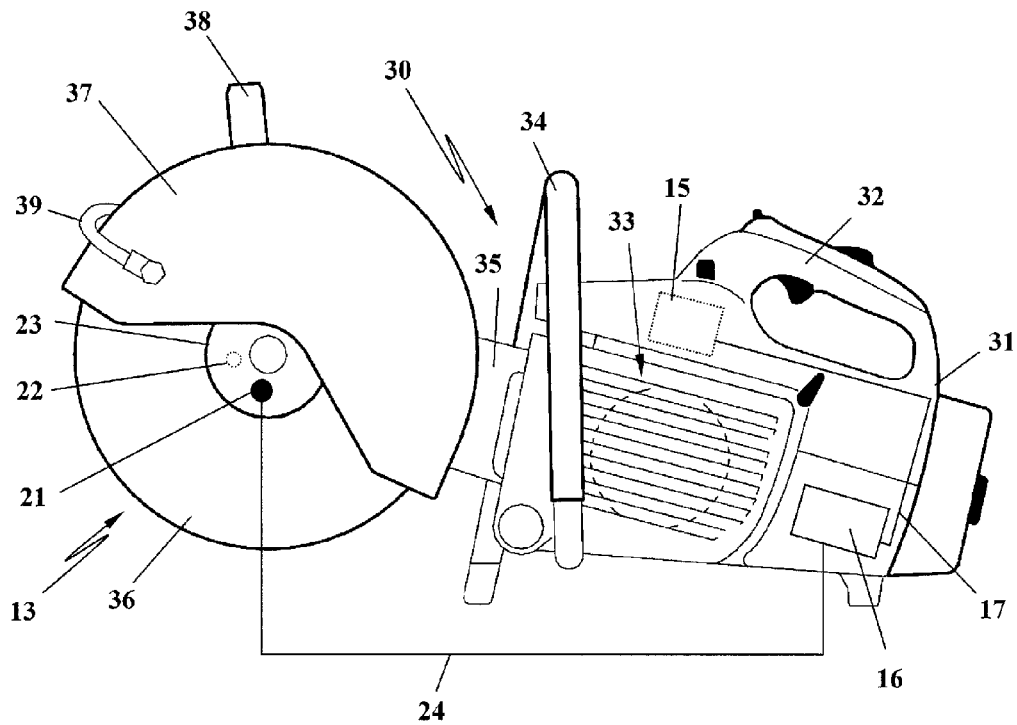
FIG. 5 is a schematic view of a cut-off machine having a cutting disc.

In the embodiment according to FIG. 5, a cut-off machine 30, which has an electric motor or combustion engine 33 arranged in a housing 31, is shown as the work apparatus. The control unit 15, which determines the rotational speed and/or power of the motor 33 according to a motor specific operating curve (FIG. 2), is provided for the control of the motor 33. In the case of a combustion engine, this can occur by changing the composition of the air/fuel mixture and/or by changing the ignition time, that is adjusting the ignition time. Correspondingly, an electric motor is controlled by influencing the current and voltage.

An operating handle 32 extending in the longitudinal direction as well as a pre-mounted bale handle 34 are provided for guiding the cut-off machine 30. A cutting disc 36, which has a protective cover 37 with an adjustment knob 38 associated therewith, is held on an arm 35. A water feed line 39 is provided on both sides of the cutting disc 36 in the protective cover 37 in order to bind the dust created when cutting and to cool the disc.

The cutting disc 36 is driven via a belt running in the arm 35 and reaches rotational speeds of 8,000 to 10,000 revolutions per minute. The cutting disc 36 is, thereby, exposed to high centrifugal forces which is why only high quality, precisely balanced cutting discs are permitted for such work apparatus.

In order to ensure that the work apparatus is only operated in the maximum power range with high quality cutting discs 36, an RFID-tag 22 is provided in the clamping area 23 of the cutting disc 36. A read unit 21—preferably fixed on the arm 35—is non-rotationally fixedly assigned to the RFID-tag 22. The identifier of the applied cutting disc 36 stored in the RFID-tag 22 is communicated to the detection unit 16 via the read unit 21. In dependence on a comparison with the stored characteristic values of the cutting discs designated as permitted from a memory chip, the detection unit 16 uses the operating curve of the drive motor—as described above—over the entire power range (second operating mode II) or limits the power output of the motor 33 to the first, lower operating mode I, when a low quality cutting disc 36 is applied whose read identifier does not correspond to any of the stored identifiers.

Figure 6:
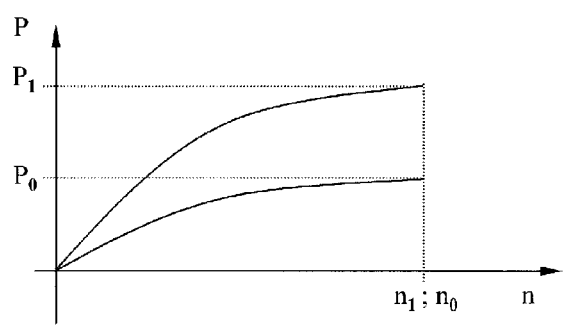
FIG. 6 is a schematic view of a further operating curve of the power as a function of the rotational speed; and, FIG. 7 is a schematic view of a third operating curve of the power as a function of the rotational speed.
Figure 7:
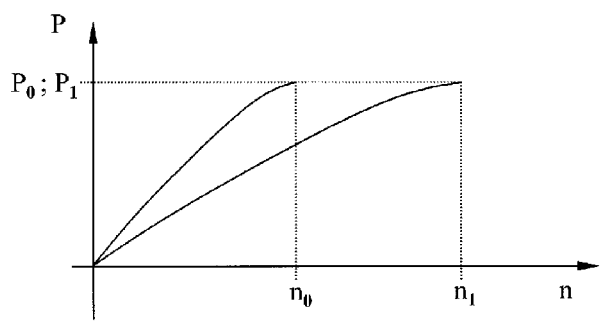

In FIGS. 6 and 7, alternative configurations of the different operating modes are shown. While the operating modes I and II differ in power and rotational speed according to the embodiment according to FIG. 2, the embodiment according to FIG. 6 provides a reduced power $P_0$ at a rotational speed $n_0$ in the operating mode I and an increased, for example, maximum power $P_1$ at a rotational speed $n_1$ in the operating mode II, whereby the rotational speeds $n_0$ and $n_1$ can be equal.

In the embodiment of FIG. 7, the configuration of the operating modes is selected in such a manner that, in the operating mode I, a reduced power $P_0$ at a rotational speed $n_0$ is provided and, in the operating mode II, an increased, for example maximum power $P_1$, at a rotational speed $n_1$ is provided, whereby the power $P_0$ and the power $P_1$ can be equal.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
a motor configured to drive an exchangeable rotating work tool having a clamping area;
a control unit configured to control the operation of said motor in a first operating mode (I) and a second operating mode (II);
said control unit being configured to operate said motor in said first operating mode (I) having at least one of a rotational speed ($n_0$) and power ($P_0$) reduced compared to said second operating mode (II);
said second operating mode (II) including the entire power range ($P_1$) and rotational speed range ($n_1$);
a detecting unit connected to said control unit and having a read unit configured to read an identifier of said work tool mounted on said work apparatus;
said detecting unit being configured to evaluate the identifier and form a release signal in dependence upon the evaluation of said identifier;
said control unit being configured to set one of said first operating mode (I) and said second operating mode (II) in dependence upon said release signal;
said read unit being an RFID-transmitter-and-receiver unit and non-rotatably mounted on said work apparatus;
an RFID-tag containing data and being carried by said work tool so as to rotate therewith; and,
said RFID-tag being mounted within said clamping area so as to place said RFID-tag at a location permitting said RFID-tag to wirelessly transfer said data thereof to said read unit during rotation of said RFID-tag relative to said read unit.

2. The work apparatus of claim 1, wherein:
said detecting unit is configured to compare the detected identifier to a predetermined identifier;
said detecting unit forms said release signal on the basis of the comparison; and,
said control unit selects one of said operating mode I and said operating mode II on the basis of the comparison.

3. The work apparatus of claim 1 further comprising a memory component having an identifier stored thereon.

4. The work apparatus of claim 3, wherein said memory component is part of said detecting unit.

5. The work apparatus of claim 1, wherein said control unit has only said two operating modes (I, II) and switches between said two operating modes (I, II).

6. The work apparatus of claim 1, wherein said work apparatus is a portable hand-guided work apparatus.

7. The work apparatus of claim 6, wherein said portable hand-guided work apparatus is selected from the group consisting of a motor-driven chain saw, a cut-off machine and a brushcutter.

8. A work apparatus comprising:
a motor configured to drive an exchangeable rotating work tool having a clamping area;
a control unit configured to control the operation of said motor in a first operating mode (I) and a second operating mode (II);
said control unit being configured to operate said motor in said first operating mode (I) having at least one of a rotational speed ($n_0$) and power ($P_0$) reduced compared to said second operating mode (II);
said second operating mode (II) including the entire power range ($P_1$) and rotational speed range ($n_1$);
a detecting unit connected to said control unit and having a read unit configured to read an identifier on said work tool mounted on said work apparatus;
said detecting unit being configured to evaluate the identifier and form a release signal in dependence upon the evaluation of said identifier;
said control unit being configured to set one of said first operating mode (I) and said second operating mode (II) in dependence upon said release signal with said work apparatus being switched to a safe mode when no release signal is present; and,
said safe mode is said first operating mode (I) having said at least one of said rotational speed ($n_0$) and said power ($P_0$) reduced compared to said second operating mode (II).

9. The work apparatus of claim 8, wherein said detecting unit is configured to compare said identifier read by said read unit to a pregiven identifier and to form said release signal in dependence upon the comparison and to select one of said first and second operating modes (I, II).

10. The work apparatus of claim 8, further comprising a memory component wherein a pregiven identifier is stored.

11. The work apparatus of claim 10, wherein said memory component is part of said detecting unit.

12. The work apparatus of claim 8, wherein said read unit is an RFID-transmitter-and-receiver unit and said work tool carries an RFID-tag.

13. The work apparatus of claim 8, wherein said control unit has only said first and second operating modes (I, II) and switches therebetween.

14. The work apparatus of claim 8, wherein said work apparatus is a portable handheld work apparatus.

15. The work apparatus of claim 14, wherein said portable handheld work apparatus is a work apparatus selected from the group comprising a motor-driven chainsaw, cutoff machine and a brushcutter.

16. The work apparatus of claim 8, further comprising an internal combustion engine to drive said work tool; and, a vibration sensor; and, said control unit being configured to operate said engine only in said first operating mode (I) when a predetermined vibration threshold value is exceeded.

* * * * *